United States Patent
Kayama

(10) Patent No.: US 11,878,258 B2
(45) Date of Patent: Jan. 23, 2024

(54) EXHAUST GAS PURIFICATION FILTER

(71) Applicant: DENSO CORPORATION, Kariya (JP)

(72) Inventor: Hiroaki Kayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 48 days.

(21) Appl. No.: 17/538,596

(22) Filed: Nov. 30, 2021

(65) Prior Publication Data

US 2022/0088521 A1 Mar. 24, 2022

Related U.S. Application Data

(63) Continuation of application No. PCT/JP2020/027331, filed on Jul. 14, 2020.

(30) Foreign Application Priority Data

Jul. 31, 2019 (JP) .................. 2019-141521

(51) Int. Cl.
*B01D 46/00* (2022.01)
*B01D 46/24* (2006.01)

(52) U.S. Cl.
CPC ..... *B01D 46/0005* (2013.01); *B01D 46/2429* (2013.01); *B01D 46/2459* (2013.01); *B01D 46/24492* (2021.08); *B01D 46/2455* (2013.01); *B01D 46/24491* (2021.08)

(58) Field of Classification Search
CPC .......... B01D 46/0005; B01D 46/24492; B01D 46/2429; B01D 46/2459; B01D 46/24491; B01D 46/2455
USPC .......................................................... 55/484
See application file for complete search history.

(56) References Cited

U.S. PATENT DOCUMENTS

| | | | |
|---|---|---|---|
| 2005/0160710 A1 | 7/2005 | Taoka et al. | |
| 2006/0166820 A1 | 7/2006 | Ogyu et al. | |
| 2007/0207070 A1* | 9/2007 | Zuberi ............. | B01D 46/24491 422/177 |
| 2009/0142543 A1* | 6/2009 | Suwabe ........... | B01D 46/24491 264/43 |

(Continued)

FOREIGN PATENT DOCUMENTS

| | | |
|---|---|---|
| JP | 2010-201363 A | 9/2010 |
| JP | 2010-207708 A | 9/2010 |

(Continued)

OTHER PUBLICATIONS

Grigorios Koltsakis et al., Catalyzed diesel particulate filter modeling, De Gruyter, DOI 10.1515/revce-2012-0008—Rev Chem Eng 2013; 29(1): 1-61 (62 pages).

(Continued)

*Primary Examiner* — Robert A Hopkins
*Assistant Examiner* — Qianping He
(74) *Attorney, Agent, or Firm* — Nixon & Vanderhye P.C.

(57) ABSTRACT

An exhaust gas purification filter includes a plurality of cells extending in a filter axial direction, a porous partition separating and defining the plurality of cells, and a sealing section sealing the plurality of cells alternately at both filter ends. In the exhaust gas purification filter, the partition has a void volume of a reduced dale, Vvv, and a material volume of a reduced peak, Vmp, as volume parameters determined in noncontact surface roughness measurement on a surface of the partition, with their total value being 1.8 $\mu m^3/\mu m^2$ or less.

4 Claims, 12 Drawing Sheets

(56) References Cited

U.S. PATENT DOCUMENTS

2009/0291256 A1   11/2009  Ohno
2013/0255207 A1   10/2013  Izumi et al.
2014/0290196 A1   10/2014  Tsuchiya

FOREIGN PATENT DOCUMENTS

| JP | 2010-260787 A | 11/2010 |
| JP | 2013-039513 A | 2/2013 |
| JP | 2013-224609 A | 10/2013 |
| JP | WO 2013/145210 A1 | 8/2015 |
| JP | 2015-183532 A | 10/2015 |

OTHER PUBLICATIONS

U.S. Appl. No. 17/575,309 to Hiroaki Kayama filed Jan. 13, 2022 (65 pages).
Office Action dated Apr. 28, 2023 issued for U.S. Appl. No. 17/575,309 (11 pages).

* cited by examiner

EXHAUST GAS PURIFICATION FILTER

CROSS-REFERENCE TO RELATED APPLICATION

This application is a U.S. continuation application of International Application No. PCT/JP2020/027331 filed on Jul. 14, 2020 which designated the U.S. and claims the benefit of Japanese Patent Application No. 2019-141521 filed on Jul. 31, 2019, the contents of each of which are incorporated herein by reference.

BACKGROUND

The present disclosure relates to an exhaust gas purification filter. Exhaust gas emitted from internal combustion engines such as gasoline engines and diesel engines contain particulate matter (hereinafter, sometimes referred to as PM) called particulates. To purify exhaust gas by trapping PM in the exhaust gas, an exhaust gas purification filter is installed in the exhaust passage of an internal combustion engine. A typical exhaust gas purification filter includes a plurality of cells extending in the filter axial direction, a porous partition separating and defining the plurality of cells, and a sealing section sealing the plurality of cells alternately at both filter ends.

SUMMARY

An aspect of the present disclosure relates to an exhaust gas purification filter including a plurality of cells, a porous partition, and a sealing section sealing, wherein the partition has a void volume Vvv of a reduced dale and a material volume Vmp of a reduced peak as volume parameters determined in noncontact surface roughness measurement on a surface of the partition, with their total value being 1.8 µm³/µm² or less.

BRIEF DESCRIPTION OF THE DRAWINGS

The above and other objects, features, and advantages of the present disclosure will be clearly apparent from the detailed description provided below with reference to the accompanying drawings, in which:

FIG. 10A illustrates a state in which ash components have been transported to and accumulated on a filter bottom area, FIG. 10B illustrates a flat partition surface on which a gas flow in the filter axial direction has higher shearing force and promotes the transportation of ash components to the filter bottom area, and FIG. 10C illustrates a partition surface with large irregularities on which a gas flow in the filter axial direction has insufficient shearing force and leaves ash components stuck to the partition surface;

DETAILED DESCRIPTION OF THE PREFERRED EMBODIMENTS

Figure 1:
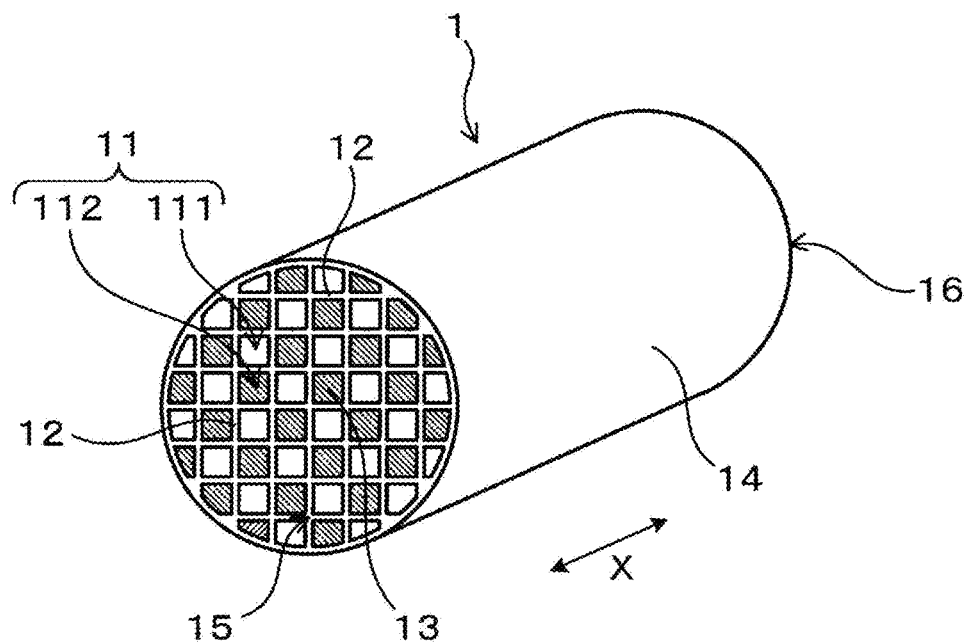
FIG. 1 is a perspective view of an exhaust gas purification filter according to a first embodiment.

For an exhaust gas purification filter, for example, WO2003/074848 A discloses an exhaust gas purifying honeycomb filter in which a columnar body formed of porous ceramic has a large number of through holes (cells) separated by walls (partitions) and arranged parallel to each other in the longitudinal direction, and some or all of the walls separating the through holes function as a filter for trapping particles. The exhaust gas purifying honeycomb filter is used appropriately for a diesel engine. In the exhaust gas purifying honeycomb filter, the through holes have a length l that is the longest side in a cross section perpendicular to the longitudinal direction, and the columnar body has a longitudinal length L with 60≤L/l≤500, as well as the inner wall of each through hole has a surface roughness Ra defined in JIS B 0601 with Ra≤100 μm. Alternatively, the through hole has an area S in a cross section perpendicular to the longitudinal direction, and the area S and the longitudinal length L of the columnar body satisfy 20≤L/S≤400, and the surface roughness Ra of the inner wall of each through hole defined in JIS B 0601 satisfies Ra 100 μm.

The amount of PM emitted from a gasoline engine is much smaller than the amount of PM emitted from a diesel engine. However, due to regulations introduced for the number of PM particles, vehicles having a gasoline engine (hereinafter, gasoline vehicles) also need to incorporate a gasoline particulate filter (hereinafter, sometimes referred to as a GPF) that is an exhaust gas purification filter capable of trapping PM emitted from the gasoline engine.

PM contains solid carbon (soot) as well as ash components (sometimes referred to as ash or Ash) originating from, for example, engine oil. The ash components are components that remain even after regeneration for PM. Thus, ash components accumulated on the partition surface during long-term use reduce the gas permeability of the partition and increase pressure loss (hereinafter, sometimes referred to as a pressure drop). In addition, gasoline engines have higher exhaust gas temperatures and faster exhaust gas flows than in diesel engines. Thus, it is important in a gasoline vehicle to reduce the pressure drop increase caused by residual ash components accumulated during long-term use.

In the above patent literature, the surface roughness Ra of the inner wall of each through hole defined in JIS B 0601 (i.e., the arithmetic average roughness determined in line roughness measurement on the inner wall of the through hole) is 100 μm or less. This is because if the inner wall of the through hole has a surface roughness Ra of more than 100 μm, ash components accumulated on the wall after regeneration of the honeycomb filter will not easily detach from the wall, and during regeneration, hot gas that has flowed into the through hole cannot move the ash components toward the exhaust gas outlet of the through hole. In other words, this conventional technique can be described as a technique for controlling the surface roughness Ra of the partition surface defined in JIS B 0601 to 100 μm or less, thus allowing ash components that have detached from a partition surface facing a cell for incoming exhaust gas to pass through pores in the partition and move to a cell for outgoing exhaust gas.

An object of the present disclosure is to provide an exhaust gas purification filter that can reduce the pressure drop increase caused by the accumulation of ash components.

An aspect of the present disclosure relates to an exhaust gas purification filter including a plurality of cells extending in the filter axial direction, a porous partition separating and defining the plurality of cells, and a sealing section sealing the plurality of cells alternately at both filter ends, wherein the partition has a void volume Vvv of a reduced dale and a material volume Vmp of a reduced peak as volume parameters determined in noncontact surface roughness measurement on a surface of the partition, with their total value being 1.8 μm³/μm² or less.

The exhaust gas purification filter has the above specific configuration. In particular, the total value of the void volume Vvv of a reduced dale and the material volume Vmp of a reduced peak of the partition surface is within the specific range. The above exhaust gas purification filter can thus reduce the pressure drop increase caused by the accumulation of ash components.

First Embodiment

An exhaust gas purification filter 1 according to a first embodiment will now be described with reference to FIGS. 1 to 12. The direction indicated by double-headed arrows shown in FIGS. 1 to 3 is defined as a filter axial direction X of the exhaust gas purification filter 1.

Figure 2:
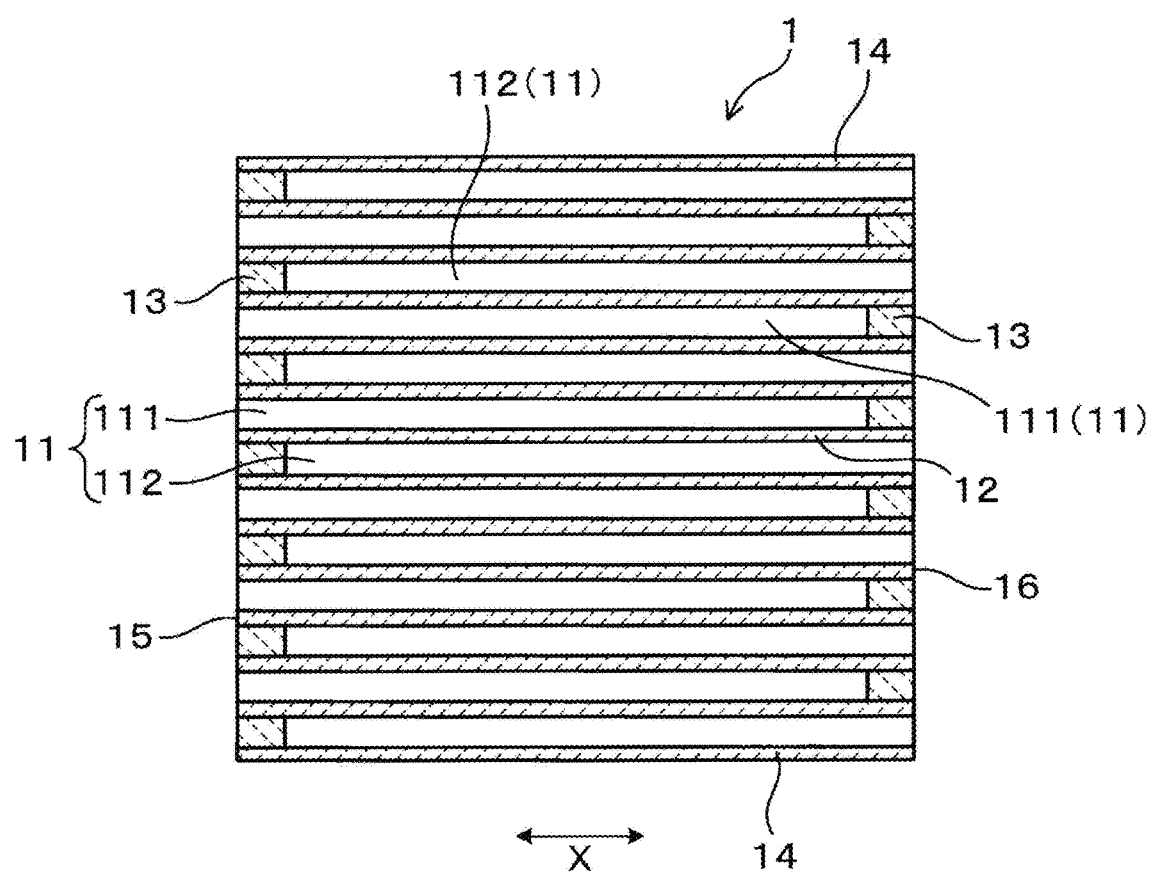
FIG. 2 is a cross-sectional view of the exhaust gas purification filter according to the first embodiment, taken in the filter axial direction.
Figure 3:
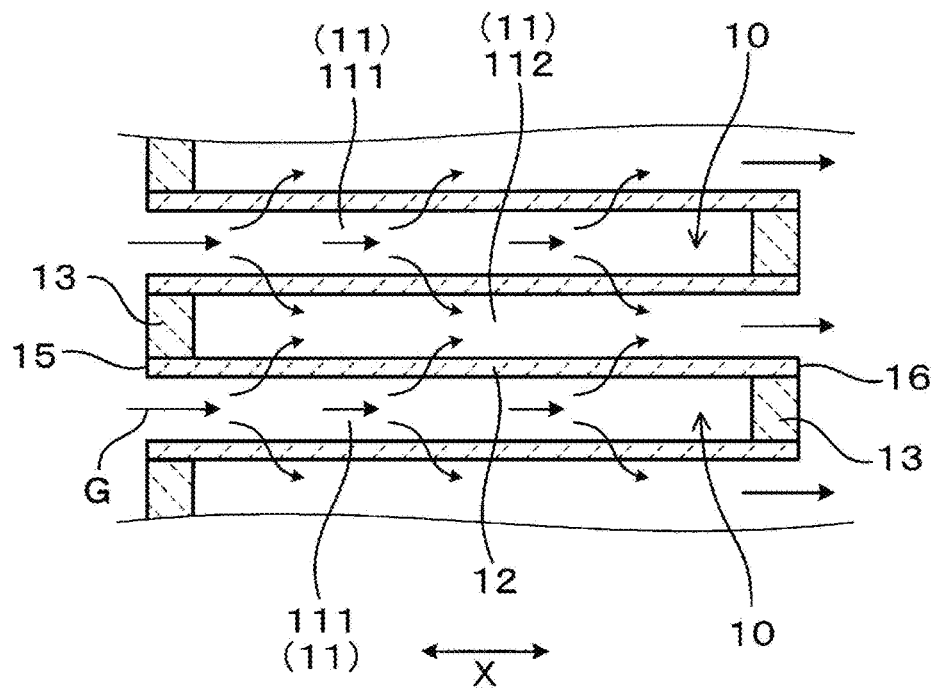
FIG. 3 illustrates the flow of exhaust gas in the exhaust gas purification filter according to the first embodiment.

As illustrated in FIGS. 1 to 3, the exhaust gas purification filter 1 includes a plurality of cells 11, a partition 12, and a sealing section 13.

As illustrated in FIGS. 1 to 3, the plurality of cells 11 extend in the filter axial direction X. More specifically, the plurality of cells 11 extend from an inlet end surface 15 that receives and inflow of exhaust gas G to an outlet end surface 16 that allows the exhaust gas G to flow out. As viewed in a cross section perpendicular to the filter axial direction X, the cells may have a shape such as a quadrangle, as illustrated in FIG. 1. The shape of the cells may not be limited to a quadrangle, but may be a polygon such as a triangle or a hexagon or a circle. The shape of the cells may also be a combination of two or more different shapes.

The partition 12 separates and defines the plurality of cells 11. More specifically, the partition 12 may be provided inside a skin 14 in a cylindrical or otherwise tubular form as a grid-like shape as viewed in a cross section perpendicular to the filter axial direction X. In the exhaust gas purification filter 1, the partition 12 and the skin 14 may be formed of ceramic such as cordierite. The partition 12 may have a thickness of, for example, 120 μm to 360 μm.

The plurality of cells 11 include inlet cells 111 that receive an inflow of exhaust gas G and outlet cells 112 that allow the exhaust gas G to flow out. The inlet cells 111 and the outlet cells 112 may be arranged in a manner to, for example, alternate in the lateral direction orthogonal to the filter axial direction X as well as in the vertical direction orthogonal to both the filter axial direction X and the lateral direction. In this case, when the inlet end surface 15 or the outlet end surface 16 is viewed in the filter axial direction X, the inlet cells 111 and the outlet cells 112 are arranged, for example, in a checked pattern. The inlet cells 111 and the outlet cells 112 are adjacent to each other and separated by the partition 12 between them.

The sealing section 13 seals the plurality of cells 11 alternately at both filter ends. More specifically, the sealing section 13, as illustrated in FIG. 2, seals the openings of the outlet cells 112 in the inlet end surface 15 and the openings of the inlet cells 111 in the outlet end surface 16. Thus, the inlet cells 111 open in the inlet end surface 15, and the openings are blocked in the outlet end surface 16 by the sealing section 13 at the outlet side. The outlet cells 112 open in the outlet end surface 16, and the openings are blocked in the inlet end surface 15 by the sealing section 13 at the inlet side. The sealing section 13 may be formed of ceramic such as cordierite or other materials.

In the present embodiment, as illustrated in FIG. 3, the exhaust gas G flows into the inlet cells 111 from the inlet end surface 15 serving as an exhaust gas inlet. After flowing into the inlet cells 111, the exhaust gas G flows in the inlet cells 111 and the partition 12, which is porous, and enters the outlet cells 112. After entering the outlet cells 112, the exhaust gas G flows in the outlet cells 112. After flowing in the outlet cells 112, the exhaust gas G flows out from the outlet end surface 16 serving as an exhaust gas outlet.

Figure 4:
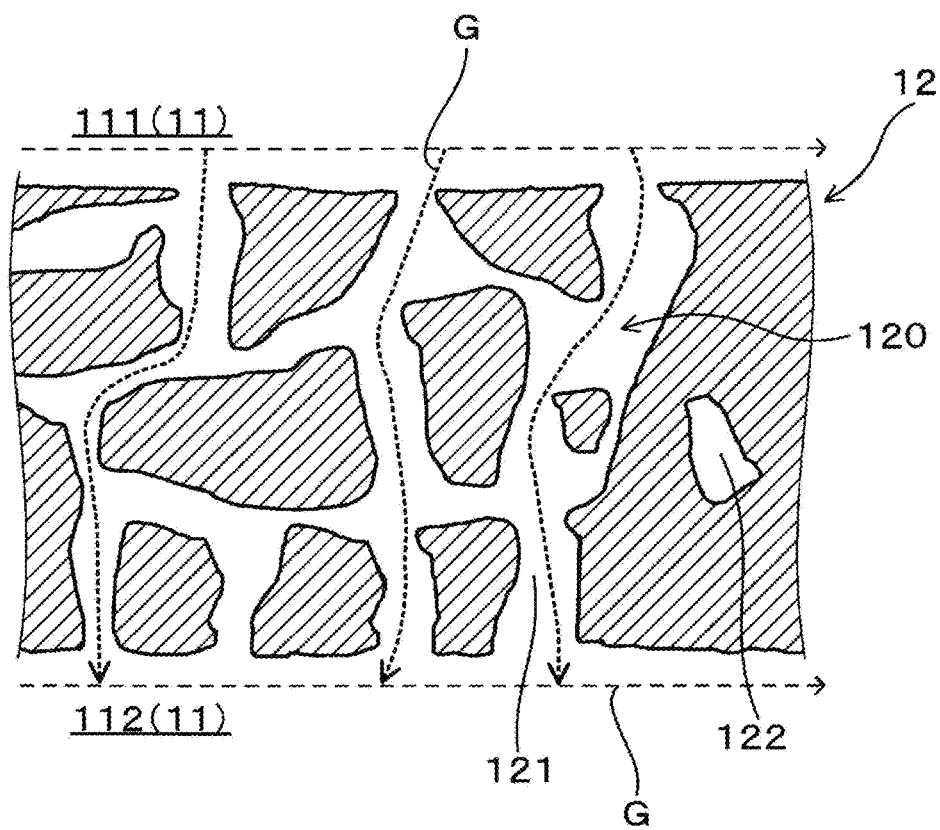
FIG. 4 schematically illustrates a cross section of a partition in the exhaust gas purification filter according to the first embodiment, taken in the thickness direction.

As illustrated in FIG. 4, the partition 12 is porous. In other words, the partition 12 has pores 120 in it. More specifically, the partition 12 may have communication pores 121 that allow communication between adjacent cells 11 across the partition 12. More specifically, the communication pores 121 open in the surface of the partition 12 facing incoming gas and the surface of the partition 12 facing outgoing gas. In other words, the communication pores 121 extend through the partition 12 to allow communication between the inlet cells 111 and the adjacent outlet cells 112. In the partition 12, the communication pores 121 serve as gas flow channels for the exhaust gas G. In addition to the communication pores 121, the partition 12 may include a non-communication pore 122 that does not allow communication between adjacent cells 11 across the partition 12.

Figure 5:
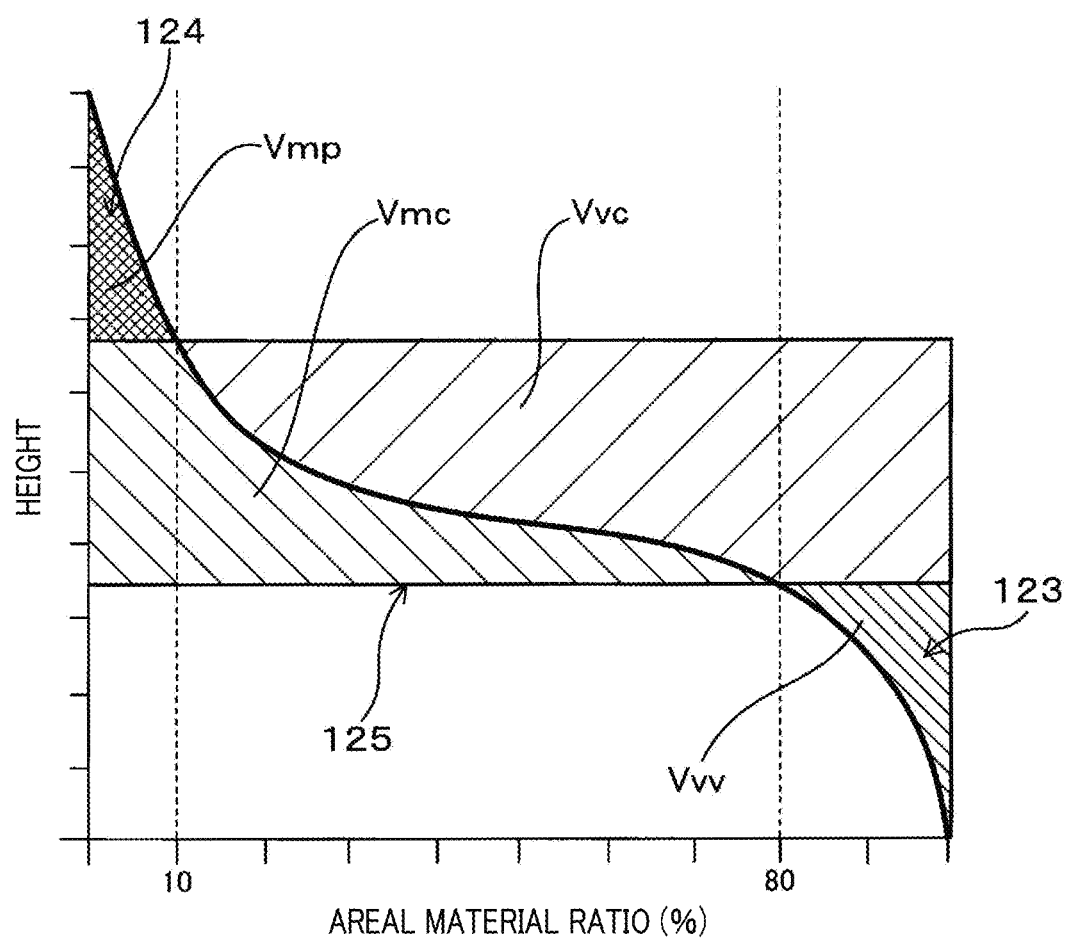
FIG. 5 shows an example material ratio curve determined in noncontact surface roughness measurement, with the horizontal axis indicating areal material ratios and the vertical axis indicating heights, illustrating a void volume Vvv of a reduced dale and a material volume Vmp of a reduced peak that are volume parameters of a partition surface.

As illustrated in FIG. 5, the partition 12 has the void volume of a reduced dale 123, Vvv, and the material volume of a reduced peak 124, Vmp, as volume parameters of the surfaces of the partition 12 determined in noncontact surface roughness measurement, with their total value (hereinafter, sometimes simply referred to as the total value of the volumes Vvv and Vmp) being 1.8 $\mu m^3/\mu m^2$ or less. The volumes Vvv and Vmp of the surfaces of the partition 12 can be measured by performing surface roughness measurement on the surface of the partition 12 facing incoming exhaust gas using a noncontact surface roughness measurement instrument capable of measuring volume parameters that are three-dimensional roughness parameters according to ISO 25178. This will be described in detail later.

The void volume of the reduced dale 123, Vvv, and the material volume of the reduced peak 124, Vmp, which are volume parameters defined in ISO 25178, will now be described with reference to FIG. 5. The surface roughness measurement performed on the measurement target surface with the noncontact surface roughness measurement instrument provides the relationship between areal material ratios (horizontal axis) and heights (vertical axis) as illustrated in FIG. 5, that is, a material ratio curve. In the measurement of the volumes Vvv and Vmp of the surfaces of the partition 12, as shown in FIG. 5, the height at an areal material ratio of 10% corresponds to the boundary between a core 125 and the reduced peak 124. The height at an area material ratio of 80% corresponds to the boundary between the core 125 and the reduced dale 123. In other words, the material ratio curve shown in FIG. 5 is divided into the reduced peak 124, the core 125, and the reduced dale 123 at areal material ratios of 10% and 80%. The material volume of the reduced peak 124 is denoted by Vmp, and the void volume of the reduced dale 123 is denoted by Vvv. Note that the material volume of the core 125 is denoted by Vmc, and the void volume of the core 125 is denoted by Vvc.

Figure 6:
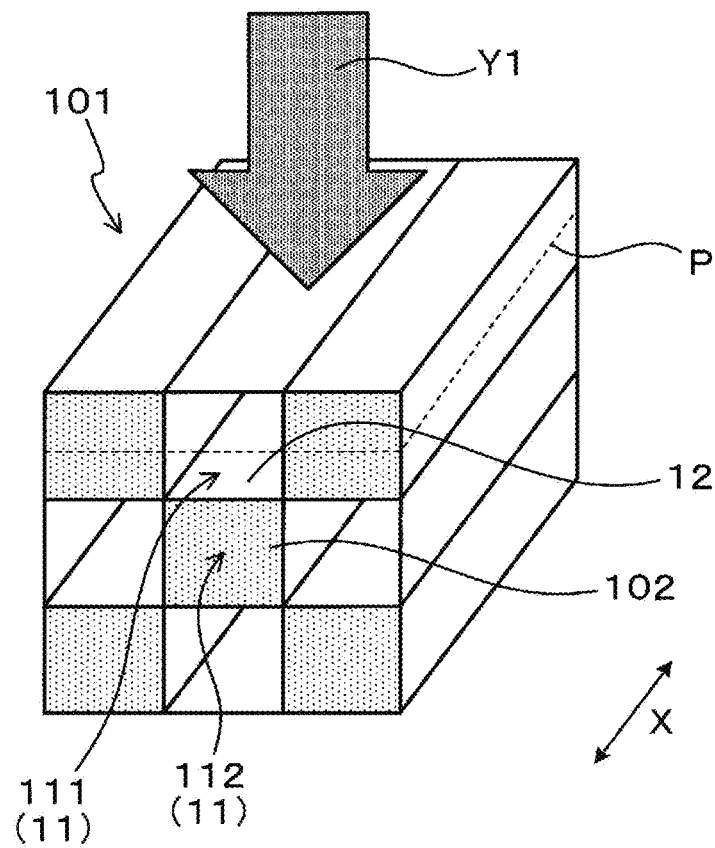
FIG. 6 schematically illustrates the shape of a partition portion extracted from the exhaust gas purification filter to measure the volumes Vvv and Vmp.

The volumes Vvv and Vmp are measured in the manner described below. More specifically, as shown in FIG. 6, a partition portion 101 is cut out from the exhaust gas purification filter 1. Note that the part with the sealing section 13 formed on it is excluded. The partition portion 101 includes a total of nine cells, three vertical cells by three horizontal cells as viewed in a cross section perpendicular to the filter axial direction X, and has the shape of a block with a length of 10 mm in the filter axial direction X. Note that dotted areas 102 on the end surface of the partition portion 101 illustrated in FIG. 6 indicate that the cells 11 with the dotted areas 102 are outlet cells 112, not that the partition portion 101 has the sealing section 13. Thus, the cells 11 without the dotted areas 102 on the end surface of the partition portion 101 are inlet cells 111, which receive an inflow of the exhaust gas G. The partition portion 101 has an outlet cell 112 positioned at its center.

Figure 7:
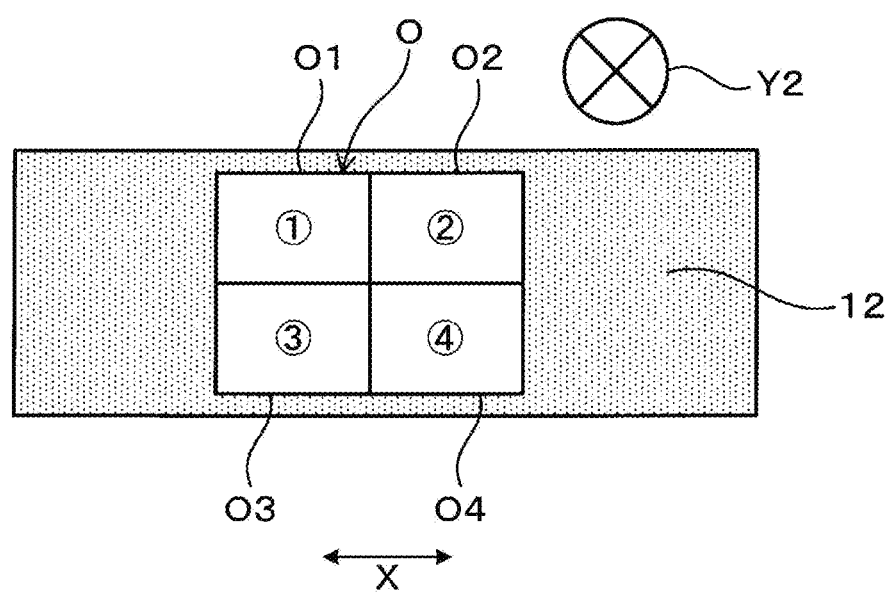
FIG. 7 is a partial view of a partition surface facing incoming exhaust gas as viewed in the direction of observation, illustrating an observation area in surface roughness measurement on the partition surface.

Then, as shown in FIG. 6, the partition portion 101 is shaved down to a dotted line position P in FIG. 6 so as to allow observation of the surface of the partition 12 facing incoming exhaust gas and included in the outlet cell 112 positioned at the center of the partition portion 101. FIG. 7 is a partial view of the surface of the partition 12 facing incoming exhaust gas as viewed in the direction of observation. FIG. 6 shows an arrow Y1 indicating the direction of observation, and FIG. 7 shows a sign Y2 indicating that the arrow Y1 shown in FIG. 6 points in the direction perpendicular to the drawing and in the depth direction. Then, the shaved partition portion 101 is set in the noncontact surface roughness measurement instrument so as to allow observation of the surface of the partition 12 facing incoming exhaust gas. The noncontact surface roughness measurement instrument may be a laser depth microscope, OLS4100, manufactured by Olympus Corporation. In the case where the laser depth microscope, OLS4100, is unavailable due to discontinuance or other reasons, the microscope may be replaced with a successor that can perform surface roughness measurement based on the same analysis principle, such as an OLS5000, manufactured by Olympus Corporation.

Then, the noncontact surface roughness measurement instrument is used to perform surface roughness measurement on the surface of the partition 12 facing incoming exhaust gas. The surface roughness measurement is performed under the conditions: a magnification of 50×, a laser wavelength of 405 nm, a scan rate corresponding to "High-precision Mode" of the measurement instrument, and an observation field formed of four continuous fields each having a 700-μm side extending in the lateral direction equal to the filter axial direction X and a 500-μm side extending in the vertical direction orthogonal to the filter axial direction X. As shown in FIG. 7, an observation area O for the surface roughness measurement on the surface of the partition 12 includes four continuous fields O1, O2, O3, and O4.

Then, analysis software in the noncontact surface roughness measurement instrument is used to read and combine the images of the four fields O1 to O4 with each other. The resultant composite image is then analyzed with height and depth information noise removed. The height information is then represented on a color scale to produce a three-dimensional image of the irregularities of the partition surface facing incoming exhaust gas. Then, the three-dimensional image of the irregularities after the above preprocessing is subjected to "Surface Roughness Measurement" of the analysis software to determine the volumes Vvv and Vmp in the partition portion 101.

The sum of the Vvv average and the Vmp average determined as described above from each of the partition portions 101 at six positions taken from the exhaust gas purification filter 1 is defined as the total value of the void volume of the reduced dale 123, Vvv, and the material volume of the reduced peak 124, Vmp, of the surface of the partition 12 determined in the noncontact surface roughness measurement.

Figure 8A:
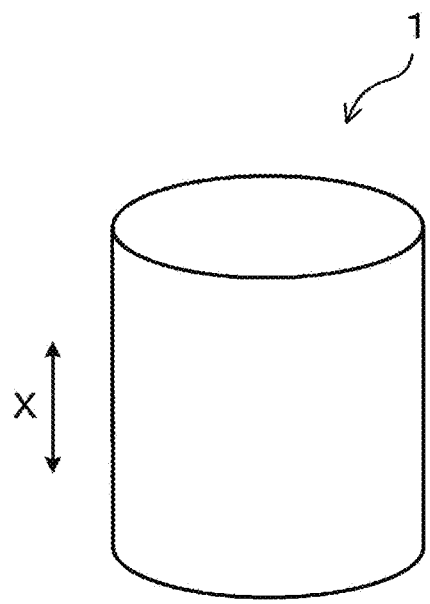
FIG. 8A schematically illustrates an example exterior shape of the exhaust gas purification filter according to the first embodiment, FIG. 8B schematically illustrates radial positions in the exhaust gas purification filter at which partition portions are extracted for surface roughness measurement on the partition surface (specifically, a cross-sectional view taken in the direction of line VIIIb-VIIIb indicated by arrows in FIG. 8C), and FIG. 8C schematically illustrates filter axial and radial positions in the exhaust gas purification filter at which partition portions are extracted (specifically, a cross-sectional view taken in the direction of line VIIIc-VIIIc indicated by arrows in FIG. 8B)
Figure 8B:
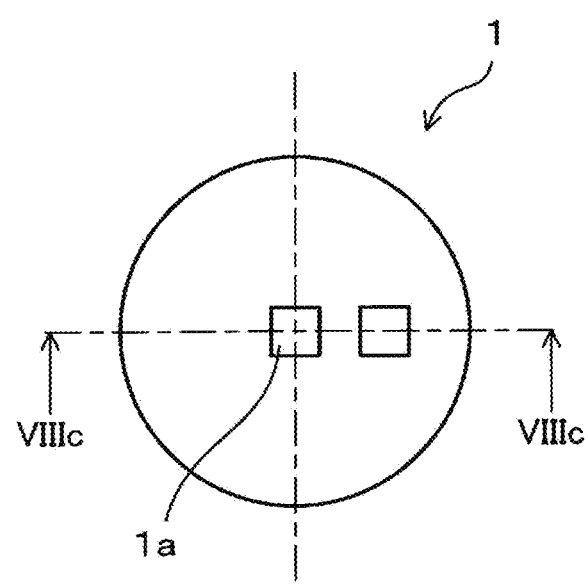
Figure 8C:
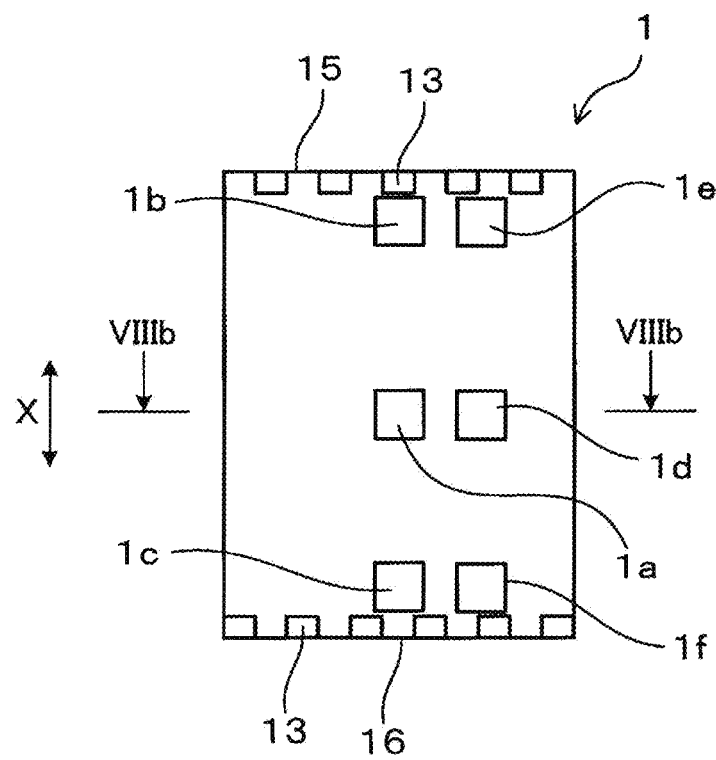

More specifically, the partition portions 101 are extracted, as shown in FIG. 8, from six positions: a central portion 1a, an upstream portion 1b near the sealing section 13 in the inlet end surface 15, and a downstream portion 1c near the sealing section 13 in the outlet end surface 16 that are aligned in the filter axial direction X through the center of the diameter of the exhaust gas purification filter 1; and a central portion 1d, an upstream portion 1e near the sealing section 13 in the inlet end surface 15, and a downstream portion 1f near the sealing section 13 in the outlet end surface 16 aligned in the filter axial direction X through the center of the radius of the exhaust gas purification filter 1.

The exhaust gas purification filter 1 has the surface of the partition 12 with the total value of the void volume of the reduced dale 123, Vvv, and the material volume of the reduced peak 124, Vmp, within the above specific range, and can thus reduce the pressure drop increase caused by the accumulation of ash components 23. The mechanism that achieves the effects will now be described with reference to FIGS. 9 to 11.

Figure 9:
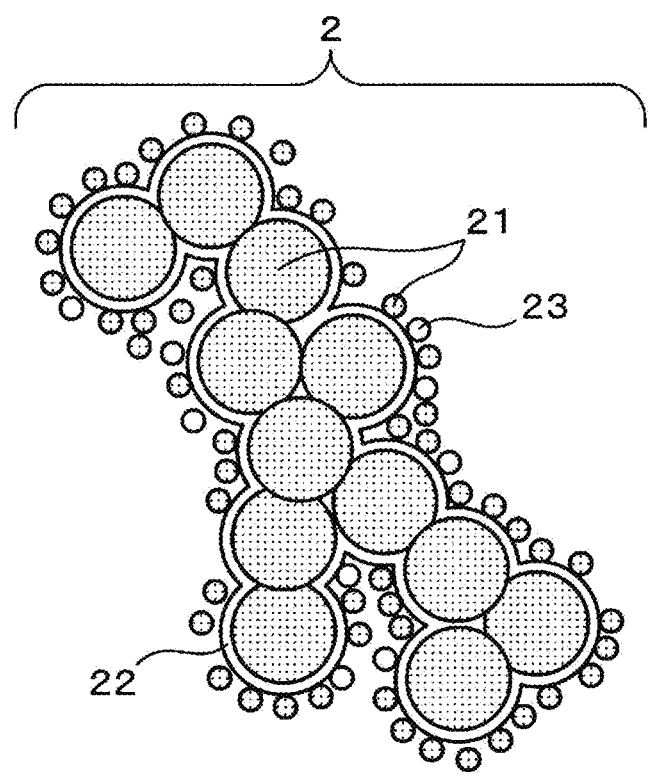
FIG. 9 schematically illustrate the microstructure of PM.
Figure 10A:
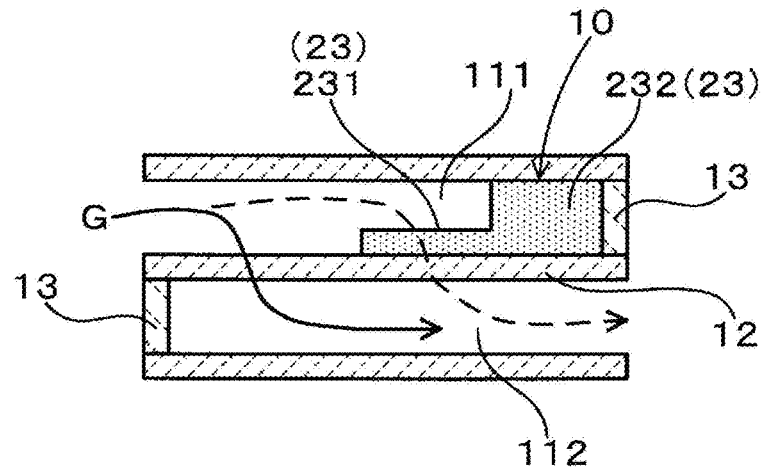
FIG. 10A to 10C schematically illustrates a mechanism that reduces the pressure drop increase caused by the accumulation of ash components in the exhaust gas purification filter according to the first embodiment.

As shown in FIG. 9, PM 2 contains solid carbon (soot) 21 as a main component as well as soluble organic fraction (SOF) 22 and the ash components 23 originating from, for example, engine oil. When the PM 2 collected on the surface of the partition 12 facing the incoming exhaust gas G (the surface of the partition 12 facing the inlet cells 111) is subjected to regeneration, the ash components 23 contained in the PM 2 remain on the surface of the partition 12. Repeated cycles of accumulation of the PM 2 containing the ash components 23 and regeneration for the PM 2 cause the ash components 23 to accumulate on the surface of the partition 12. As shown in FIG. 10A, the ash components 23 accumulated on the surface of the partition 12 (hereinafter, sometimes referred to as wall ash components 231) block the surface openings of the communication pores 121 in the surface of the partition 12, thus causing the gas permeability of the partition 12 to decrease and the pressure drop to increase.

Figure 10B:
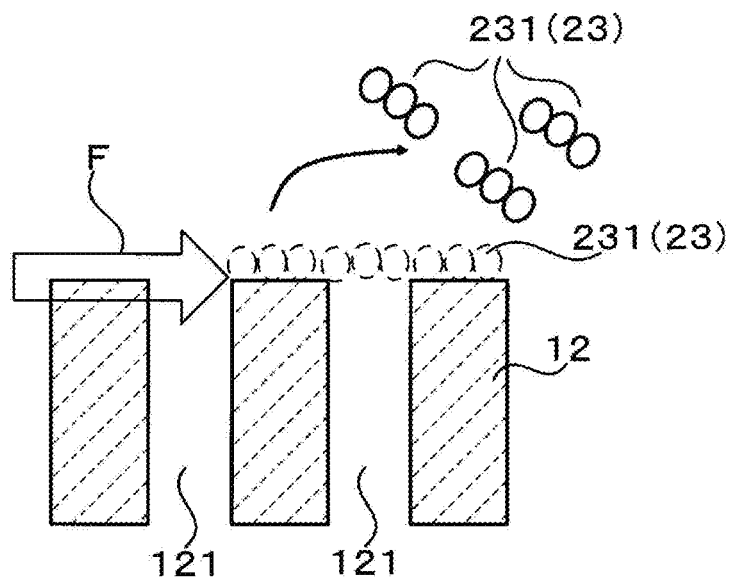

However, for the exhaust gas purification filter 1 in which the total value of the volumes Vvv and Vmp of the surface of the partition 12 is within the above specific range, as schematically illustrated in FIG. 10B, the surface of the partition 12 has only small irregularities (the surface of the partition 12 is flat), and thus shearing force F caused by the exhaust gas G in the filter axial direction X becomes higher. When the shearing force F exceeds the bonding strength between the surface of the partition 12 and the wall ash components 231, the wall ash components 231 detach from the surface of the partition 12, and the stripped wall ash components 231 are transported toward the sealing section 13 at the gas outlet side. The transported wall ash components 231 accumulate on a filter bottom area 10 located most downstream in the filter (also referred to as the most downstream area of the inlet cells 111; see FIG. 3). Hereinafter, the ash components 23 accumulated on the filter bottom area 10 will sometimes be referred to as bottom ash components 232. The wall ash components 231 reduce the gas permeability of the partition 12 and thus increase the pressure drop, whereas the bottom ash components 232 are less likely to reduce the gas permeability of the partition 12 and thus less likely to increase the pressure drop. In this manner, the exhaust gas purification filter 1 in which the total value of the volumes Vvv and Vmp of the surface of the partition 12 is within the above specific range enables the bottom ash components 232 to be larger in amount than the wall ash components 231. In other words, since the total value of the volumes Vvv and Vmp of the surface of the partition 12 is within the above specific range, the exhaust gas purification filter 1 can accelerate the conversion of the wall ash components 231 into the bottom ash components 232. The bottom ash components 232 larger in amount allow the gas permeability of the partition 12 to be maintained even after long-term use, resulting in smaller pressure drop. This mechanism enables the exhaust gas purification filter 1 to reduce the pressure drop increase caused by the accumulation of the ash components 23 during long-term use.

Figure 10C:
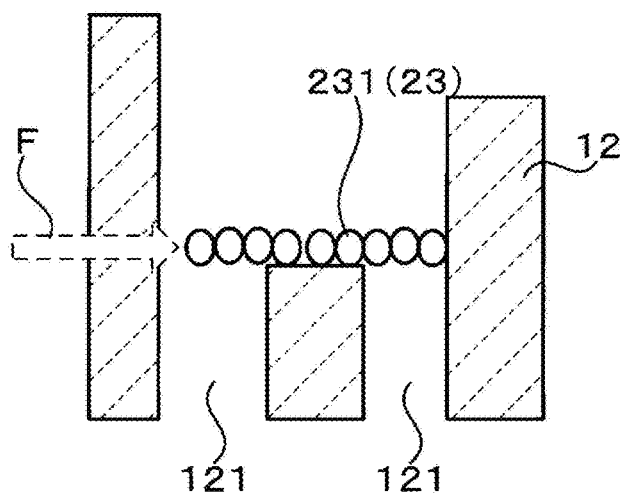

In contrast, for an exhaust gas purification filter in which the total value of the volumes Vvv and Vmp of the surface of the partition 12 is out of the above specific range, as schematically illustrated in FIG. 10C, the surface of the partition 12 has large irregularities, which stand as a barrier to reduce the shearing force F of the exhaust gas G in the filter axial direction X. Thus, the wall ash components 231 continue to cover the surface openings of the communication pores 121 without detaching from the surface of the partition 12. As a result, the gas permeability of the partition 12 deteriorates, increasing the pressure drop.

Figure 11A:
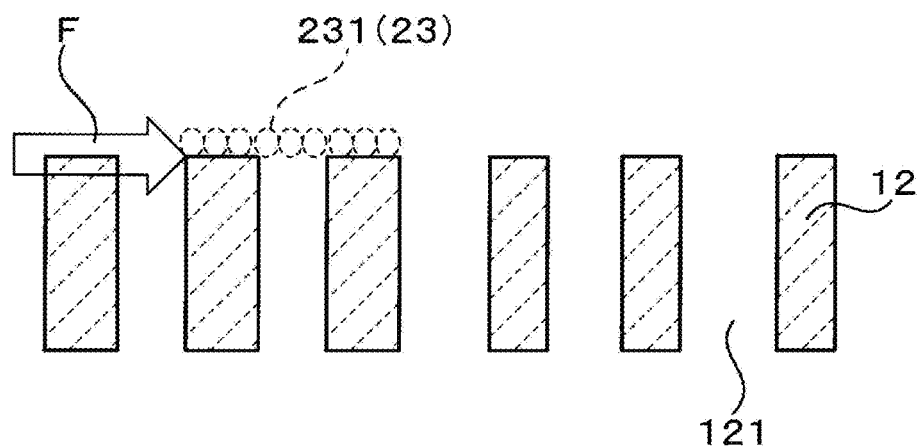
FIGS. 11A and 11B illustrate a problem caused by defining the state of the partition surface in accordance with the arithmetic average roughness Ra of the partition surface determined in line roughness measurement defined in JIS B 0601.
Figure 11B:
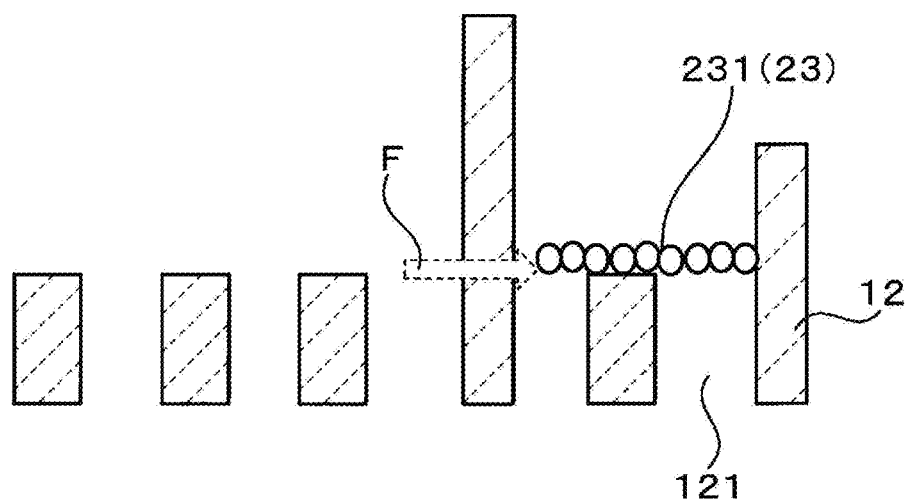

Under the definition of the arithmetic average roughness Ra of the surface of the partition 12 determined in line roughness measurement defined in JIS B 0601, no shearing force F may be caused by the exhaust gas G in some spots in the filter axial direction X. In this case, the pressure drop increase caused by the accumulation of the ash components 23 cannot be reduced. In other words, as shown in FIG. 11, the partition surface state in FIG. 11A and the partition surface state in FIG. 11B have the same roughness Ra. However, in the partition surface state in FIG. 11B, the exhaust gas G is less likely to generate the shearing force F in the filter axial direction X. Thus, the wall ash components 231 do not become detached, and the pressure drop increase caused by the accumulation of the ash components 23 cannot be reduced. Although not shown, for example, the maximum height roughness Rz of the surface of the partition 12 determined in line roughness measurement defined in JIS B 0601 is a height parameter including no three-dimensional information, and even for a partition 12 having a surface of the same projection height, if its projection volume is larger, the exhaust gas G is less likely to generate the shearing force F in the filter axial direction X. As a result, the wall ash components 231 do not become detached, and the pressure drop increase caused by the accumulation of the ash components 23 cannot be reduced. In contrast, the measure of the total value of the volumes Vvv and Vmp of the surface of the partition 12 allows the production of the exhaust gas purification filter 1 that causes no such problems and efficiently improves the shearing force F of the exhaust gas G in the filter axial direction X, reducing the pressure drop increase caused by the accumulation of the ash components 23.

In order to reliably reduce the pressure drop increase caused by the accumulation of the ash components 23, the total value of the volumes Vvv and Vmp may be preferably 1.75 $\mu m^3/\mu m^2$ or less, more preferably 1.7 $\mu m^3/\mu m^2$ or less, still more preferably 1.65 $\mu m^3/\mu m^2$ or less, yet more preferably 1.6 $\mu m^3/\mu m^2$ or less, and yet still more preferably 1.55 $\mu m^3/\mu m^2$ or less. In contrast, the total value of the volumes Vvv and Vmp may be preferably 1.1 $\mu m^3/\mu m^2$ or more. This is for the following reasons. If the total value of the volumes Vvv and Vmp is too small, that is, the partition 12 has only quite small irregularities, the partition 12 with catalyst supported on it will have, for example, reduced catalyst supporting force associated with the anchor effect, and the catalyst may detach from the partition 12. Thus, with these taken into account, the total value of the volumes Vvv and Vmp may be preferably 1.1 $\mu m^3/\mu m^2$ or more.

In the exhaust gas purification filter 1, the mean pore size of the partition 12 may be 12 $\mu m$ or more. This structure allows the ash components 23 accumulated on the surface of the partition 12 to be stripped off by the shearing force of the exhaust gas G and transported to the filter bottom area 10, and also enables the ash components 23 to easily pass through the partition 12, thus facilitating a further reduction in the pressure drop increase caused by the accumulation of the ash components 23. In order to allow the ash components 23 to easily pass through, the mean pore size of the partition 12 may be preferably 14 μm or more, and more preferably 16 μm or more. If the mean pore size of the partition 12 is quite large, the PM 2 will slip through and the initial PM filtration performance will decrease. Thus, the mean pore size of the partition 12 may be 22 μm or less. In order to prevent a decrease in the initial PM filtration performance, the mean pore size of the partition 12 may be preferably 20 μm or less, more preferably 18 μm or less, and still more preferably 16 μm or less.

In the exhaust gas purification filter 1, the porosity of the partition 12 may be 50% or more. This structure allows the ash components 23 accumulated on the surface of the partition 12 to be stripped off by the shearing force of the exhaust gas G and transported to the filter bottom area 10, and also enables the ash components 23 to easily pass through the partition 12, thus facilitating a further reduction in the pressure drop increase caused by the accumulation of the ash components 23. In order to allow the ash components 23 to easily pass through, the porosity of the partition 12 may be preferably 55% or more, and more preferably 60% or more. In contrast, the porosity of the partition 12 may be 70% or less. This structure allows the exhaust gas purification filter 1 to ensure its strength easily, and reduces the possibility of cracks occurring due to the stress during a casing process or the heat generation during regeneration for the PM 2. In other words, this structure increases the likelihood that the exhaust gas purification filter 1 has structural reliability. In order to improve the strength of the exhaust gas purification filter 1, the porosity of the partition 12 may be preferably 67% or less, and more preferably 65% or less.

The mean pore size and the porosity of the partition 12 are measured with a mercury porosimeter based on the principle of mercury porosimetry. More specifically, a test piece is cut out from the exhaust gas purification filter 1. Note that the part with the sealing section 13 formed on it is excluded. The test piece is a rectangular solid with dimensions of 15 mm by 15 mm in a plane orthogonal to the filter axial direction X and with a length of 20 mm in the filter axial direction X. Then, the test piece is placed in the measurement cell of the mercury porosimeter, and the measurement cell is depressurized. After that, the measurement cell is charged with mercury and pressurized. Based on the applied pressure and the volume of the mercury contained in the pores in the partition 12 included in the test piece, the pore size and the pore volume are measured. The measurement is performed at a pressure ranging from 0.5 to 20,000 psia. It is noted that 0.5 psia corresponds to $0.35 \times 10^{-3}$ kg/mm$^2$, and 20,000 psia corresponds to 14 kg/mm$^2$. The pore size range corresponding to this pressure range is 0.01 to 420 μm. The pore size is calculated from a pressure using constants that are a contact angle of 140° and a surface tension of 480 dyn/cm. The mean pore size of the partition 12 is the pore size at which the cumulative pore volume from the smallest pore size in the pore size distribution of the partition 12 reaches 50% (the pore size at the 50% cumulative pore volume). The porosity of the partition 12 can be calculated from the following relational expression:

Porosity (%) of partition 12=Total pore volume/(Total pore volume+1/True specific gravity of partition material)×100.

For a partition material that is cordierite, the true specific gravity of the cordierite may be 2.52.

In the exhaust gas purification filter 1, the communication pores 121 in the partition 12 may have a tortuosity of less than 1.4. The tortuosity of the communication pores 121 is defined by the ratio of the average flow channel length L (μm) of the communication pores 121 to the thickness T (μm) of the partition 12. This structure allows the ash components 23 to easily pass through the partition 12 because of the low tortuosity of the communication pores 121 serving as gas flow channels in the thickness direction of the partition 12. In other words, with the above structure, the communication pores 121 serving as gas flow channels have a smaller resistance, the ash components 23 are less likely to be caught in the pore wall surface of the communication pores 121, and the communication pores 121 are less likely to be blocked by the ash components 23. Thus, the above structure can achieve the effect of reducing the pressure drop increase by allowing the ash components 23 accumulated on the surface of the partition 12 to detach from and be transported to the filter bottom area 10, and also achieve the effect of reducing the pressure drop increase by facilitating the passage of the ash components 23. Accordingly, the above structure can further reduce the pressure drop increase caused by the accumulation of the ash components 23.

In order to allow the ash components 23 to easily pass through, the tortuosity of the communication pores 121 may be preferably 1.4 or less, and more preferably 1.3 or less. If the tortuosity of the communication pores 121 is quite small, the PM 2 may slip through and the initial PM filtration performance may decrease. Thus, the tortuosity of the communication pores 121 may be preferably 1.0 or more, more preferably 1.1 or more, and still more preferably 1.2 or more.

Figure 12:
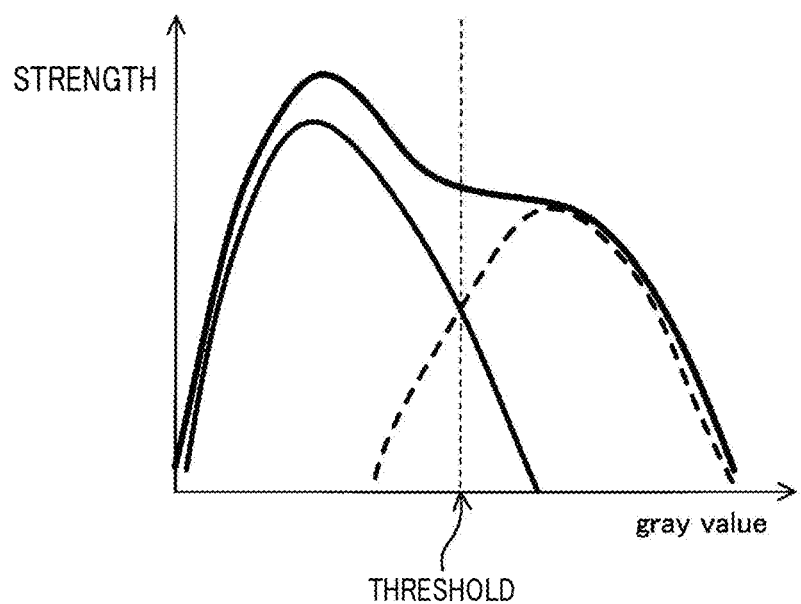
FIG. 12 is an example gray value plot used to measure the tortuosity of communication pores in the partition.

The tortuosity of the communication pores 121 is measured in the manner described below. A partition piece is cut out from the exhaust gas purification filter 1. Note that the part with the sealing section 13 formed on it is excluded. The partition piece is a rectangular solid (plate) with a length of about 600 μm in the filter axial direction X, a width of about 600 μm in the direction of the surface of the partition 12 orthogonal to the filter axial direction X, and a thickness equal to the thickness of the partition 12. Then, the partition piece is embedded in resin while being degassed in a vacuum to provide an X-ray CT imaging sample. As to the sample, an X-ray CT apparatus is used to take serial tomographic images under the imaging conditions: a voltage of 80 kV, a step of 0.1°, and a resolution of 0.684787 μm/pixel. The serial tomographic images are taken, for example, in the TIFF format. The resultant serial tomographic images are read with 0.6874787 μm/voxel using the importGeo-Vol function, or an interface of GeoDict, which is microstructure simulation software developed by Math2Market GmbH. Then, to separate the substantial part (specifically, the ceramic part) and the space (specifically, the pore part) in the read images, the partition piece is represented as a three-dimensional model with a threshold that is the intersection of two separate hills in a gray value plot as shown in FIG. 12. Then, the noise in the three-dimensional model is removed, and an unnecessary part is also removed so as to provide a shape of 900 voxels×600 voxels×the thickness voxels of the partition 12. Then, for the three-dimensional model, the flow channel lengths (μm) of all the communication pores 121 are measured. The PM 2 flows along with the stream of gas. The gas will flow, as a fluid, through the shortest flow channels in the communication pores 121. The flow channels subjected to the above length measurement are the shortest flow channels that allow gas to flow in the communication pores 121. In other words, the flow channel length of each communication pore 121 is a parameter that may be different from the length of the center line of the communication pore 121. GeoDict can simulate gas flowing in the three-dimensional model of the partition 12 and thus identify the pores in which the gas flows. The average value of the obtained flow channel lengths of all the communication pores 121 is defined as the average flow channel length L (μm) of the communication pores 121. In addition, the thickness (μm) of the three-dimensional model is defined as the thickness T (μm) of the partition 12 in which the tortuosity is calculated. Then, the tortuosity of the partition piece is calculated by dividing the average flow channel length L (μm) of the communication pores 121 determined as described above by the thickness T (μm) of the partition 12. The tortuosity of the communication pores 121 in the partition 12 is defined as the average tortuosity determined as described above from the partition pieces of the six portions extracted from the exhaust gas purification filter 1, or specifically, the same portions 1a to 1f as shown in FIG. 8 used in the above measurement of the total value of the volumes Vvv and Vmp.

The exhaust gas purification filter 1 can exert its effects sufficiently when used in an exhaust passage for a gasoline engine, that is, as a GPF. However, the exhaust gas purification filter 1 may also be used in an exhaust passage for a diesel engine, that is, as a diesel particulate filter (DPF). The exhaust gas purification filter 1 may be used with a catalyst supported on the partition 12 or without a catalyst supported on the partition 12. With a catalyst supported on the partition 12, the amount of the supported catalyst may be, for example, 50 g/L or more and 150 g/L or less.

The above exhaust gas purification filter 1 may be produced, for example, in the manner described below.

To produce the exhaust gas purification filter 1, a raw material powder for ceramic used to form the partition 12, a binder, a solvent, a pore-forming material added as appropriate, and additives such as a dispersant and a lubricant are mixed to prepare a body. The raw material powder for ceramic used to form the partition 12 may be selected as appropriate in accordance with the ceramic for forming the partition 12. For example, if the ceramic for forming the partition 12 is cordierite, the raw material powder for ceramic may contain a magnesium source such as magnesia, an aluminum source such as alumina, and a silicon source such as silica. If the ceramic for forming the partition 12 is aluminum titanate, the raw material powder for ceramic may contain a titanium source such as titania and an aluminum source such as alumina. If the ceramic for forming the partition 12 is silicon carbide, the raw material powder for ceramic may contain a carbon source and a silicon source. The contents of the components may be adjusted as appropriate so as to provide desired ceramic. In the present embodiment, the method of producing the exhaust gas purification filter 1 will be described in detail with reference to an example in which the partition 12 of the exhaust gas purification filter 1 is formed from cordierite.

First, a body containing cordierite-forming raw materials is prepared. The body can be prepared by putting silica, talc, and aluminum hydroxide together in a manner to attain cordierite composition, and further adding and mixing a binder such as methylcellulose, a pore-forming material such as graphite, a dispersant such as an anionic dispersant or a cationic dispersant, lubricating oil, and water as appropriate. So as to attain cordierite composition, alumina and kaolin may be blended. The silica may be porous silica. In the cordierite-forming raw materials, the silica and the talc may serve as pore-forming raw materials. The pore-forming raw materials are materials for forming the pores 120. When calcined, the pore-forming raw materials generate liquid-phase components, which form the pores 120. In the cordierite-forming raw materials, the aluminum hydroxide, the alumina, and the kaolin may serve as raw materials for aggregate. The raw materials for aggregate are materials for forming the ceramic part other than the pores 120.

Then, the prepared body is forced through a die to extrude a honeycomb extrudate. The honeycomb extrudate is then dried and fired. As a result, the honeycomb structure is formed. The honeycomb structure is a portion including the cells 11, the partition 12, and the skin 14. The sealing section 13 may be formed before or after the honeycomb structure is fired. More specifically, for example, seal-forming slurry may be used to alternately seal the openings of the cells 11 in the honeycomb structure after the firing or the honeycomb extrudate before the firing, and the slurry may be fired to form the sealing section 13.

The total value of the void volume of the reduced dale 123, Vvv, and the material volume of the reduced peak 124, Vmp, in the surface of the partition 12 may be controlled to the above-described desired range by, for example, adjusting the maximum height roughness Rz (defined in JIS B0601-2001) of the slit surface of the die used to extrude the honeycomb extrudate. The slit is a section through which the body passes to shape the part serving as the partition 12. The mean pore size and the porosity of the partition 12 may also be controlled to the above-described desired ranges by, for example, adjusting the particle diameter d50 of the pore-forming raw materials and the content of the pore-forming raw materials. The above particle diameter d50 can be obtained based on the particle size distribution on the volumetric basis determined by a laser diffraction particle size analyzer (the same holds true for the following, and will not be described redundantly).

The tortuosity of the communication pores 121 in the partition 12 may also be controlled to the above-described desired range by, for example, promoting contact between the pore-forming raw materials in the body. This is because pore-forming raw materials in contact with each other during a liquid-phase reaction will improve the communication property of the pores 120, resulting in lower tortuosity, due to the fact that the pore-forming raw materials diffuse to make the pores 120. To selectively bring pore-forming raw materials into contact with each other in the body, for example, dispersants such as anionic dispersants and cationic dispersants may be used in the preparation of the body. Examples of the anionic dispersants include Nopcosperse 44-C (manufactured by Sanyo Chemical Industries, Ltd.), whereas examples of the cationic dispersants include Nopcosperse 092 (manufactured by Sanyo Chemical Industries, Ltd.).

More specifically, a predetermined content of pore-forming raw materials (in this example, a mixed powder of silica and talc) is divided into two halves. To provide one half of the pore-forming raw materials with negative electric charges, the half of the pore-forming raw materials, an anionic dispersant, and water are premixed to give a first mixture. The first mixture has the anionic dispersant attached to the half of the pore-forming raw materials. To provide the other half of the pore-forming raw materials with positive electric charges, the latter half of the pore-forming raw materials, a cationic dispersant, and water are premixed to give a second mixture. The second mixture has the cationic dispersant attached to the latter half of the pore-forming raw materials. Then, the first mixture, the second mixture, the raw materials for aggregate, and other raw materials added as appropriate are further mixed. In this manner, the body is produced with the pore-forming raw materials in contact with each other. The tortuosity of the communication pores 121 in the partition 12 may be controlled to the above-described desired range by, for example, modifying the types of dispersants, the contents of the dispersants, the premixing time for mixing the pore-forming raw materials and the dispersants, the revolution speed for the extrusion, and the time for drying the body. However, too long a premixing time for mixing the pore-forming raw materials and the dispersants may cause the formation of the communication channels 121 to be unsuccessful, and thus it is preferable to adjust the premixing time appropriately. Furthermore, too large a particle diameter of raw materials for aggregate surrounding the pore-forming raw materials may cause the formation of the communication channels 121 to be unsuccessful, and thus it is also preferable to adjust the particle diameter ratio between the pore-forming raw materials and the raw materials for aggregate.

Experimental Example

Production of Exhaust Gas Purification Filter

In the present experimental example, the above method of producing the exhaust gas purification filters was used to produce samples 1 to 10, which were cordierite exhaust gas purification filters shown in Table 1, described later. In the present experimental example, no catalyst layers were formed on the partition.

More specifically, porous silica, talc, and aluminum hydroxide were prepared as cordierite-forming raw materials. The porous silica and the talc are pore-forming raw materials, and the aluminum hydroxide is a raw material for aggregate.

Then, a mixed powder of the porous silica and the talc was divided into two halves. One half of the mixed powder was mixed with an anionic dispersant and water, whereas the other half of the mixed powder was mixed with a cationic dispersant and water. In this manner, a first slurry mixture containing pore-forming raw materials provided with negative electric charges, and a second slurry mixture containing pore-forming raw materials provided with positive electric charges were obtained. The amount of the anionic dispersant contained in the first mixture was 2 to 15 wt % with respect to the total amount of the porous silica and the talc, which was taken as 100 wt %, and the amount of the water contained was half the amount needed to prepare a body. The anionic dispersant used was Nopcosperse 44-C, manufactured by Sanyo Chemical Industries, Ltd. The amount of the cationic dispersant contained in the second mixture was 2 to 15 wt % with respect to the total amount of the porous silica and the talc, which was taken as 100 wt %. The amount of the water contained was half the amount needed to prepare the body. The cationic dispersant used was Nopcosperse 092, manufactured by Sanyo Chemical Industries, Ltd.

Then, the first mixture, the second mixture, the aluminum hydroxide, a dispersant, and lubricating oil were further mixed. In this manner, the body was prepared. The dispersant used was polyoxyethylene polyoxypropylene glyceryl ether having an average molecular weight of 4,550.

Then, the body was forced through a die, and the resultant honeycomb extrudate was fired at 1,410° C., a sealing section was then formed. As a result, an exhaust gas purification filter was obtained.

In the present experimental example, the maximum height roughness Rz of the slit surface of the die used for the extrusion was adjusted within the range of 1 to 15 μm to reduce the partition surface irregularities and adjust the total value of the void volume Vvv of the reduced dale and the material volume Vmp of the reduced peak of the partition surface to the above-described desired range. The roughness Rz of the slit surface of the die was adjusted by pouring an abrasive. In addition, the particle diameter d50 of the mixed powder of the porous silica and the talc (i.e., the pore forming material) was changed within the range of 5 to 35 μm to adjust the mean pore size of the partition to the above-described desired range. In addition, the amount of the mixed powder of the porous silica and the talc was changed within the range of 40 to 70% of the total amount of the raw materials to adjust the porosity of the partition to the above-described desired range. The content of each of the cationic dispersant and the anionic dispersant was changed within the range of 2 to 15 wt %, and also the time for premixing the first mixture and the second mixture and the time for mixing the body were each changed within the range of 5 to 150 minutes to adjust the tortuosity of the communication pores to the above-described desired range. In the present experimental example, these adjustments were combined to give the exhaust gas purification filters of samples 1 to 10, which are listed in Table 1.

Then, for comparison, samples 1C and 2C were prepared, which were cordierite exhaust gas purification filters shown in Table 1, described later. More specifically, the exhaust gas purification filter of sample 1C was obtained in the same manner as the preparation of samples 1 to 10 except that the slit surface of the die had a roughness Rz of more than 15 μm and the mixed powder of the porous silica and the talc had a particle diameter d50 of more than 35 μm. In addition, the exhaust gas purification filter of sample 2C was obtained in the same manner as the preparation of samples 1 to 10 except that the slit surface of the die had a roughness Rz of more than 15 μm (and more than the roughness Rz for the preparation of the sample 1C) and the mixed powder of the porous silica and the talc had a particle diameter d50 of more than 35 μm.

In the present experimental example, the exhaust gas purification filter of each sample has dimensions of φ118.4 mm (filter diameter)×L120 mm (filter length), with a cell structure having a partition thickness of 8.5 mil and a cell count of 300 cpsi.

Measurement of Partition Characteristics

Each sample was subjected to noncontact surface roughness measurement on the partition surface facing incoming exhaust gas in accordance with the above measurement method to calculate the total value of the void volume Vvv of the reduced dale and the material volume Vmp of the reduced peak of the partition surface. The noncontact surface roughness measurement was performed using a laser depth microscope (noncontact surface roughness measurement instrument), OLS4100, manufactured by Olympus Corporation. The combination of the four field images by the analysis software of OLS4100 was performed by "Image Stitching" in "Data Processing." In the image stitching, "Overlap Width" was set at 3%, and "Correct Boundary between Images" and "Equalize Brightness of Luminance Image" were selected. For noise removal from the height and depth information on the combined images, the luminance threshold for removal was set at "Determine Automatically," and the area for removal was set at "Overall Area."

For each of the samples, the porosity and the mean pore size of the partition were measured in accordance with the above measurement method. The mercury porosimeter used was an AutoPore IV9500, manufactured by Shimadzu Corporation. Furthermore, for each of the samples, the tortuosity of the communication pores in the partition was measured in accordance with the above measurement method. The X-ray CT apparatus used was a Versa XRM-500, manufactured by Xradia, Inc. The microstructure simulation software used was GeoDict 2017, sold by SCSK Corporation.

Measurement of Initial PM Collection Efficiency, Initial Pressure Drop, and Rate of Change in Pressure Drop after Accumulation of Ash Components
(Initial PM Collection Efficiency)

Figure 13:
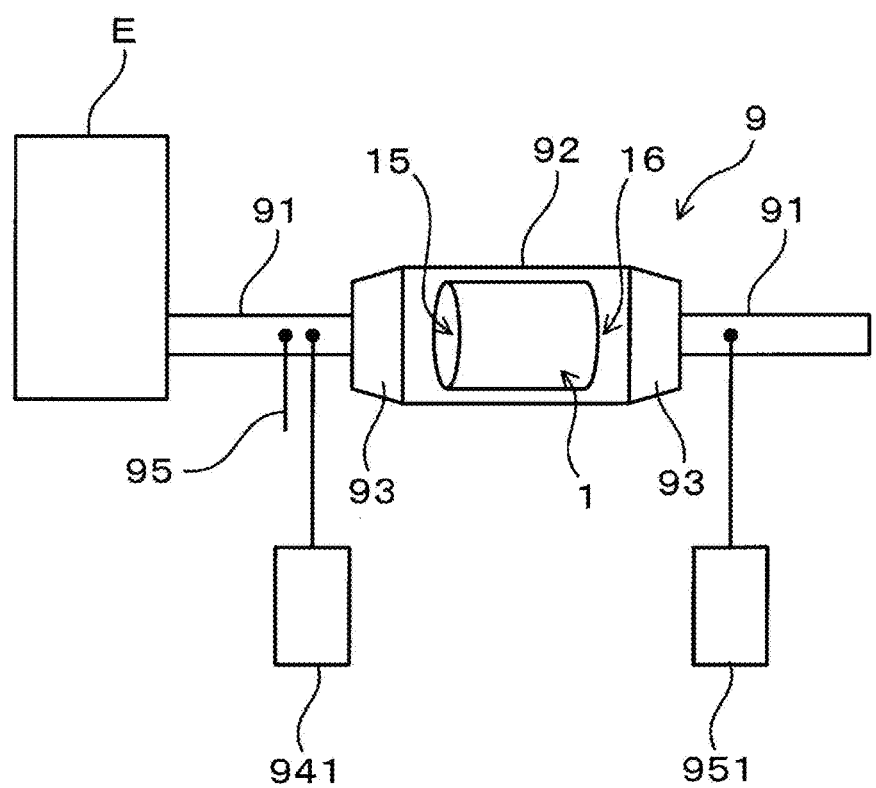
FIG. 13 illustrates a method of measuring the initial PM collection efficiency in an experimental example.

The initial PM collection efficiency was measured as detailed below. As shown in FIG. 13, a test device 9 was prepared including pipes 91, a case 92 that contains the sample exhaust gas purification filter 1, and cones 93 that connect the pipes 91 and the case 92. The pipe 91 upstream of the case 92 is connected to an engine E that generates exhaust gas. In the present experimental example, the engine E used was a gasoline direct injection engine (displacement: 2.0 L, turbocharged, four-cylinder). The pipe 91 upstream of the case 92 was provided with an upstream PM particle counter 941 and a temperature sensor 95. The pipe 91 downstream of the case 92 was provided with a downstream PM particle counter 951. Each of the upstream PM particle counter 941 and the downstream PM particle counter 951 was an AVL-489, manufactured by AVL List GmbH. The exhaust gas emitted from the engine E flowed through the sample exhaust gas purification filter 1. During this time, the number of PM particles in the exhaust gas before flowing into the sample exhaust gas purification filter 1, $N_{in}$, and the number of PM particles in the exhaust gas after flowing out of the sample exhaust gas purification filter 1, $N_{out}$, were measured, and the initial PM collection efficiency was calculated from the formula: $100\times\{1-(N_{in}-N_{out})/N_{in}\}$. The measurements were performed under the conditions: a temperature of about 500° C. and an intake airflow rate of 25 g/sec. The measurements were performed using the exhaust gas purification filter 1 in the initial state with no PM and no ash components accumulated, and not coated with catalyst.

(Initial Pressure Drop)

Figure 14:
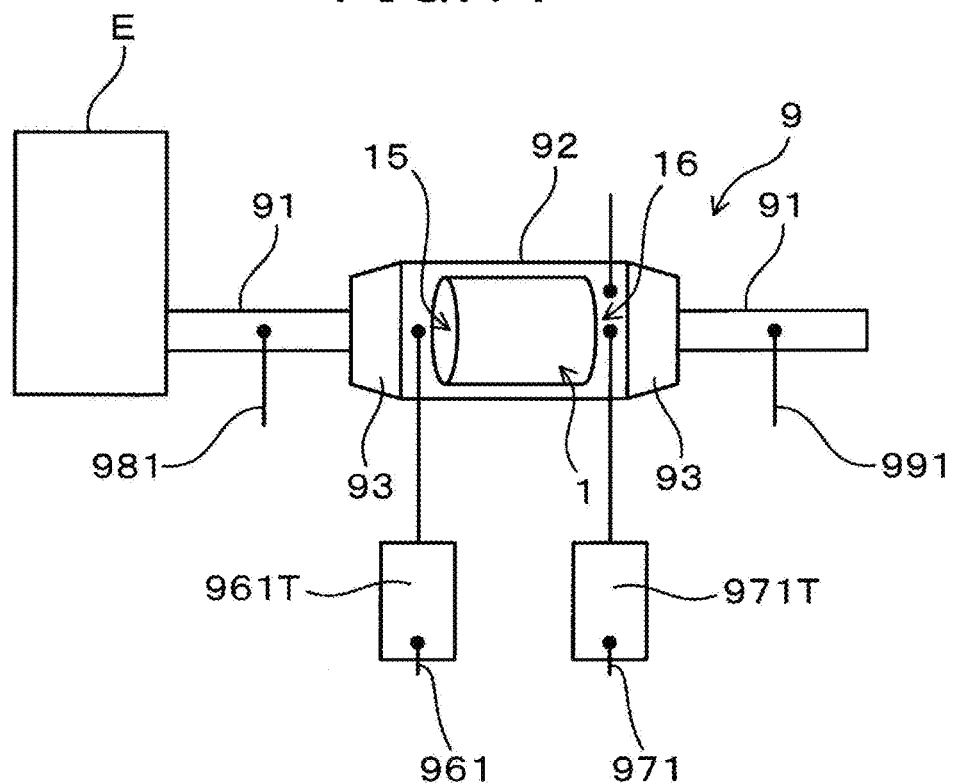
FIG. 14 illustrates a method of measuring a pressure drop in the experimental example.

The initial pressure drop was measured as detailed below. As shown in FIG. 14, a test device 9 was prepared including pipes 91, a case 92 that contains the sample exhaust gas purification filter 1, and cones 93 that connect the pipes 91 and the case 92. The pipe 91 upstream of the case 92 is connected to an engine E that generates exhaust gas. In the present experimental example, the engine E used was a gasoline direct injection engine (displacement: 2.0 L, turbocharged, four-cylinder). The test device 9 was provided with an upstream pressure sensor 961 and a downstream pressure sensor 971 to enable measurement of the pressures in front of and behind the sample exhaust gas purification filter 1. Each of the upstream pressure sensor 961 and the downstream pressure sensor 971 was a DG-932-C, manufactured by Tokyo Aircraft Instrument Co., Ltd. Note that sign 961T denotes a surge tank for the upstream pressure sensor 961, and sign 971T denotes a surge tank for the downstream pressure sensor 971. The pipe 91 upstream of the case 92 includes an upstream A/F sensor 981, and the pipe 91 downstream of the case 92 includes a downstream A/F sensor 991. The upstream pressure sensor 961 and the downstream pressure sensor 971 respectively measured the pressure in front of (upstream of) the sample exhaust gas purification filter 1 and the pressure behind (downstream of) the exhaust gas purification filter 1, and the difference between the measured pressures was defined as a pressure drop. The measurements were performed under the control conditions: A/F: 14.6±0.3, the intake airflow rate: 100 g/sec, and the speed of the engine E: 4,500 rpm. Regarding the temperatures during the measurements, the exhaust gas temperature was 700 to 750° C., and the central temperature of the sample exhaust gas purification filter was 600 to 650° C. The measurements were performed using the exhaust gas purification filter 1 in the initial state with no PM and no ash components accumulated, and coated with no catalyst.

(Rate of Change in Pressure Drop after Accumulation of Ash Components)

The rate of change in the pressure drop after the accumulation of ash components was measured as detailed below. A sample exhaust gas purification filter was installed in the exhaust passage of a gasoline direct injection engine (displacement: 2.0 L, turbocharged, four-cylinder). Then, to accelerate the accumulation of ash components on the partition, the fuel supply system for feeding the engine with fuel (commercially available high-octane gasoline) was charged with engine oil (CASTLE SN5W-30, manufactured by TOYOTA MOTOR CORPORATION) at a rate of 0.48 L/hour. Then, with the A/F ratio controlled within the range of 14.5±0.4, ash components were allowed to accumulate in the sample exhaust gas purification filter at an accumulation rate of 1.3 g/L per hour. More specifically, the accumulation of ash components was achieved by repeating the cycle of a PM accumulation process followed by a regeneration process. In the PM accumulation process, PM was allowed to accumulate for nine minutes at an engine speed of 2,500 prm and an intake manifold pressure of −10 kPa. In the regeneration process, the fuel supply was cut, and regeneration was performed by burning the PM for one minute at an engine speed of 2,500 prm and an intake manifold pressure of −90 kPa without the filter temperature exceeding 900° C. The amount of the accumulated ash components was determined by taking out the exhaust gas purification filter from the exhaust passage as needed, and measuring the weight on an off-line electronic scale. In this manner, while regeneration for PM was performed repeatedly in the exhaust gas purification filter in the initial state with no PM and no ash components accumulated, and coated with no catalyst, ash components were allowed to accumulate in an amount of 60 g/L.

Then, in the same manner as the above measurement of the initial pressure drop, the pressure in front of (upstream of) the exhaust gas purification filter and the pressure behind (downstream of) the exhaust gas purification filter were measured, and the difference between the measured pressures was defined as the pressure drop after the accumulation of the ash components. With the initial pressure drop (kPa) denoted by $P_{fresh}$, and the pressure drop after the accumulation of the ash components (kPa) denoted by $P_{ash\text{-}loaded}$, the absolute value of the value calculated from the formula, $100\times(P_{ash\text{-}loaded}-P_{fresh})/P_{fresh}$, was determined as the rate of change in the pressure drop after the accumulation of the ash components (%).

In the present experimental example, when the rate of change in the pressure drop after the accumulation of ash components was less than 250%, the sample was determined to have reduced the pressure drop increase caused by the accumulation of the ash components. Then, when the rate of change in the pressure drop after the accumulation of ash components was 220% or more and less than 250%, the sample was rated B. When the rate of change in the pressure drop after the accumulation of ash components was 210% or more and less than 220%, the sample was rated A. When the rate of change in the pressure drop after the accumulation of ash components was less than 210%, the sample was rated A+. In a gasoline vehicle, however, the initial PM collection efficiency is preferably 60% or more, and thus samples with the initial PM collection efficiency being less than 60% were downgraded by one rank. In contrast, when the rate of change in the pressure drop after the accumulation of ash components was 250% or more, the sample was determined to have failed to reduce the pressure drop increase caused by the accumulation of the ash components, and rated C.

Figure 15:
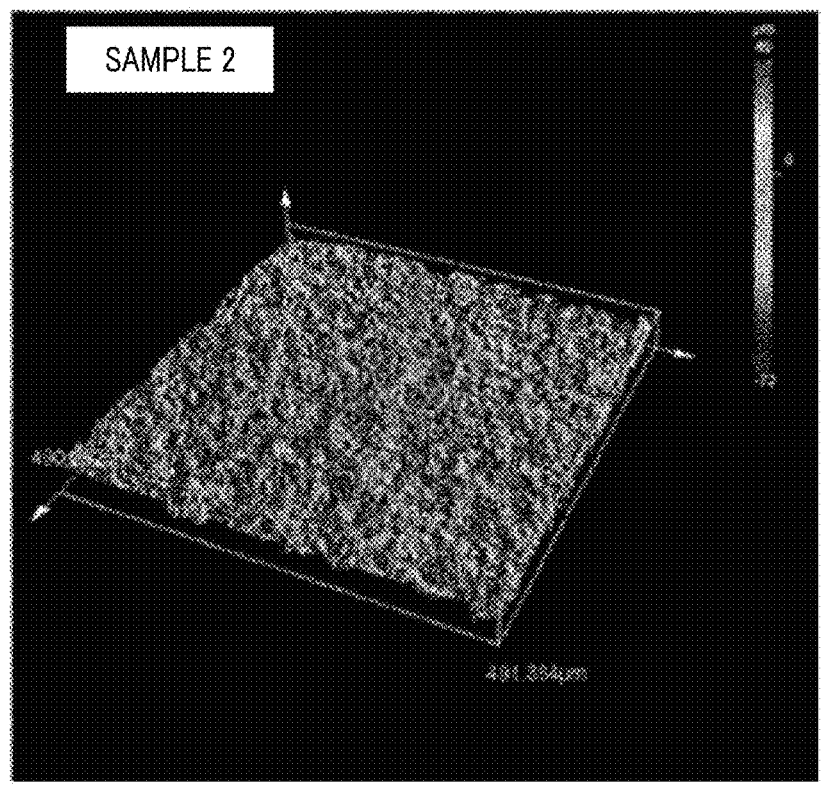
FIG. 15 is a three-dimensional image of the irregularities of a partition surface facing incoming exhaust gas, the image taken from the exhaust gas purification filter of sample 2 during surface roughness measurement in the experimental example.
Figure 16:
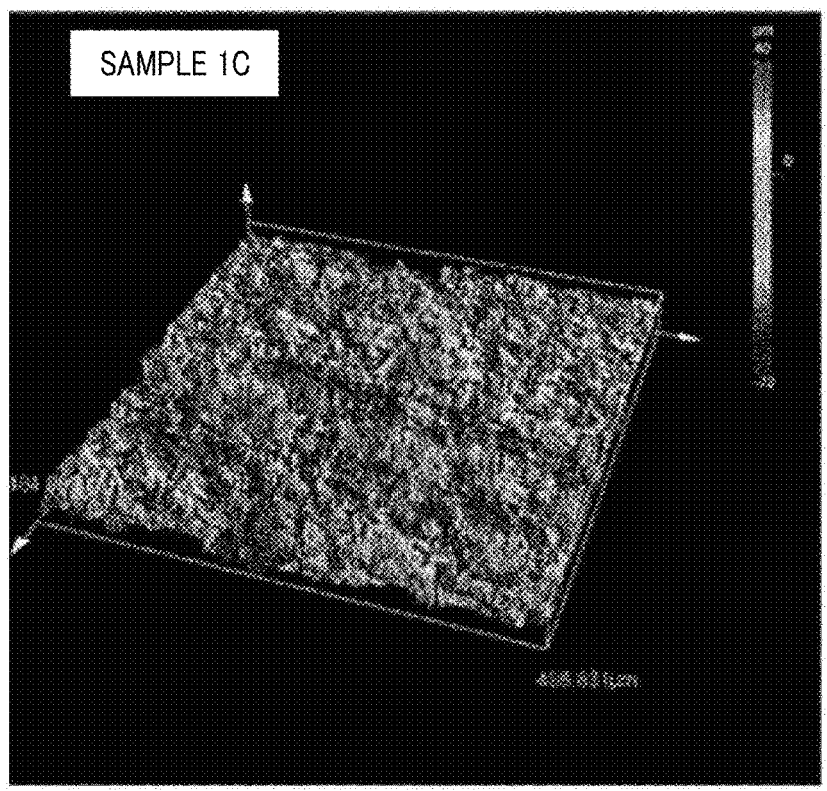
FIG. 16 is a three-dimensional image of the irregularities of a partition surface facing incoming exhaust gas, the image taken from the exhaust gas purification filter of sample 1C during surface roughness measurement in the experimental example.
Figure 17:
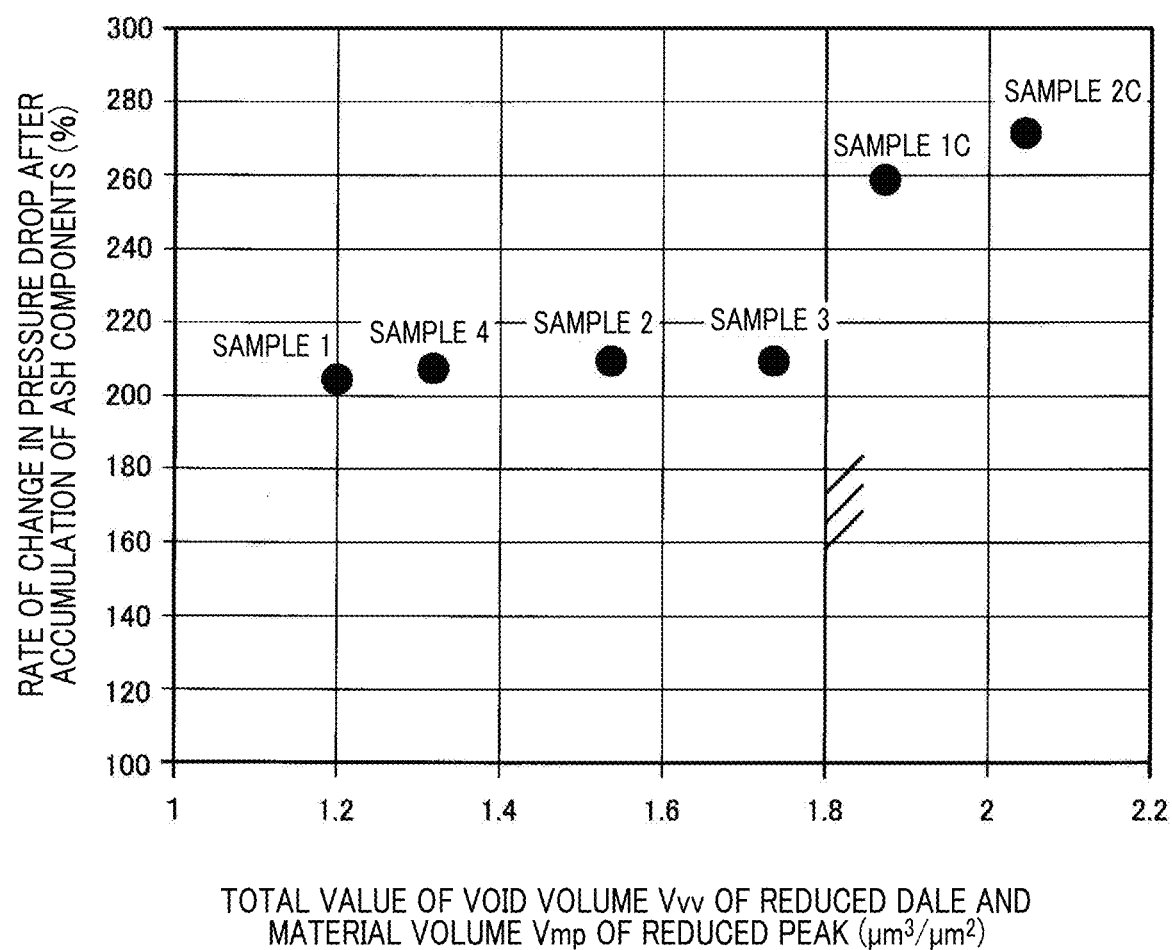
FIG. 17 shows the relationship found in the experimental example between the total value of the void volume Vvv of the reduced dale and the material volume Vmp of the reduced peak of a partition surface determined in noncontact surface roughness measurement (horizontal axis), and the rate of change in pressure drop after the accumulation of ash components (vertical axis).

The results of the above experiment are summarized in Table 1. FIG. 15 shows a three-dimensional image of the irregularities of the partition surface facing incoming exhaust gas in the exhaust gas purification filter of sample 2, which is taken as a representative of samples 1 to 10. For comparison, FIG. 16 shows a three-dimensional image of the irregularities of the partition surface facing incoming exhaust gas in the exhaust gas purification filter of sample 1C. FIG. 17 shows the relationship between the total value of the void volume Vvv of the reduced dale and the material volume Vmp of the reduced peak (horizontal axis), and the rate of change in the pressure drop after the accumulation of ash components (vertical axis).

maintained. As shown in FIG. 17, areas with the total value of the volumes Vvv and Vmp being 1.8 $\mu m^3/\mu m^2$ or less show a plateau in the effect of reducing the pressure drop increase caused by the accumulation of ash components. This may be for the following reasons. Specifically, ash components accumulated on the partition surface detach from through the above mechanism when the above shearing force exceeds the bonding strength between the partition surface and the wall ash components. Thus, areas with the total value of the volumes Vvv and Vmp being 1.8 $\mu m^3/\mu m^2$ or less seem to have already attained shearing force satisfying the criterion. In the areas, wall ash components have been transported sufficiently to the filter bottom area, and thus further reduction in the irregularities of the partition surface would add little effect.

Table 1 also indicates that partitions 12 having a mean pore size of 12 μm or more allow a further reduction in the pressure drop increase caused by the accumulation of ash components. This is because the ash components accumulated on the partition surfaces were more likely to be stripped off and transported by the shearing force of the

TABLE 1

| | Partition Characteristics | | | | | | |
|---|---|---|---|---|---|---|---|
| | Total Value of Void volume Vvv of reduced dale and Material volume Vmp of reduced peak ($\mu m^3/\mu m^2$) | Porosity (%) | Mean pore size (%) | Tortuosity (−) | Initial PM Collection Efficiency (%) | Initial Pressure Drop (kPa) | Rate of Change in Pressure Drop after Accumulation of Ash Components (%) | Evaluation |
| Sample 1 | 1.20 | 63 | 23 | 1.23 | 57.1 | 6.1 | 205 | A |
| Sample 2 | 1.54 | 64 | 19 | 1.23 | 70.6 | 6.0 | 209 | A+ |
| Sample 3 | 1.74 | 60 | 18 | 1.26 | 68.2 | 6.5 | 209 | A+ |
| Sample 4 | 1.32 | 53 | 18 | 1.24 | 70.1 | 6.0 | 207 | A+ |
| Sample 5 | 1.20 | 63 | 10 | 1.23 | 69 | 6.4 | 212 | A |
| Sample 6 | 1.20 | 63 | 11 | 1.23 | 66 | 6.5 | 213 | A |
| Sample 7 | 1.80 | 42 | 18 | 1.24 | 65.3 | 6.7 | 221 | B |
| Sample 8 | 1.80 | 48 | 18 | 1.25 | 67 | 6.6 | 224 | B |
| Sample 9 | 1.54 | 64 | 19 | 1.34 | 68 | 6.2 | 235 | B |
| Sample 10 | 1.54 | 64 | 19 | 1.42 | 73 | 6.3 | 248 | B |
| Sample 1C | 1.88 | 64 | 23 | 1.29 | 59.2 | 6.3 | 262 | C |
| Sample 2C | 2.05 | 64 | 18 | 1.25 | 72 | 6.2 | 270 | C |

Table 1 and FIGS. 15 to 17 have revealed the following. The exhaust gas purification filters of samples 1C and 2C, in each of which the partition surface has large irregularities, and the total value of the void volume Vvv of the reduced dale and the material volume Vmp of the reduced peak of the partition surface facing incoming exhaust gas is out of the specific range defined in the present disclosure, have failed to reduce the pressure drop increase caused by the accumulation of ash components.

In contrast, the exhaust gas purification filters of samples 1 to 10, in each of which the partition surface has small irregularities, and the total value of the void volume Vvv of the reduced dale and the material volume Vmp of the reduced peak of the partition surface facing incoming exhaust gas is within the specific range defined in the present disclosure, have reduced the pressure drop increase caused by the accumulation of ash components.

This is because, as described above, the increased shearing force of the exhaust gas in the filter axial direction stripped off and transported the wall ash components accumulated on the partition surface toward the filter bottom area, and the gas permeability of the partition surface was exhaust gas to the filter bottom area, and also the ash components were more likely to pass through the partitions. However, for partitions 12 having a mean pore size of more than 22 μm, the initial PM collection efficiency tended to decrease. This is because the quite large mean pore size of the partitions caused PM to slip through.

Table 1 also indicates that partitions having a porosity of 50% or more allow a further reduction in the pressure drop increase caused by the accumulation of ash components. This is because the ash components accumulated on the partition surfaces were more likely to be stripped off and transported by the shearing force of the exhaust gas to the filter bottom area, and also the ash components were more likely to pass through the partitions.

Table 1 also indicates that partitions having a tortuosity of the communication pores 121 of less than 1.4 allow a further reduction in the pressure drop increase caused by the accumulation of ash components. This is because the communication pores serving as gas flow channels had a smaller resistance, the ash components were less likely to be caught in the pore wall surface of the communication pores, and the communication pores were less likely to be blocked by the ash components, and as a result, the structure achieved the effect of reducing the pressure drop increase by allowing the ash components accumulated on the partition surface to detach from and be transported to the filter bottom area, and also the effect of reducing the pressure drop increase by facilitating the passage of the ash components.

The present disclosure is not limited to the embodiments and experimental examples described above, and may be modified variously without departing from the spirit and scope thereof. In other words, although the present disclosure has been described in accordance with the embodiments, it will be understood that this disclosure is not limited to the embodiments or the structures. This disclosure encompasses various modifications and alterations falling within the range of equivalence. Additionally, various combinations and forms as well as other combinations and forms with one, more than one, or less than one element added thereto also fall within the scope and spirit of the present disclosure.

What is claimed is:

1. An exhaust gas purification filter comprising:
    a plurality of cells extending in a filter axial direction;
    a porous partition separating and defining the plurality of cells; and
    a sealing section sealing the plurality of cells alternately at both filter ends,
    wherein the porous partition has a void volume of a reduced dale, Vvv, and a material volume of a reduced peak, Vmp, being volume parameters determined in noncontact surface roughness measurement on a surface of the porous partition, with a total value of the volume Vvv and the volume Vmp being 1.1 $\mu m^3/\mu m^2$ or more and 1.8 $\mu m^3/\mu m^2$ or less, the total value of the volumes Vvv and Vmp of the surface of the porous partition being within a range so as to provide a configuration that a shearing force exceeds a bonding strength between the surface of the porous partition and wall ash components, the shearing force being a force caused by exhaust gas in the filter axial direction, and the wall ash components being ash components accumulated on the surface of the porous partition.

2. The exhaust gas purification filter according to claim 1, wherein
    the porous partition has a mean pore size of 12 μm or more and 22 μm or less.

3. The exhaust gas purification filter according to claim 1, wherein
    the porous partition has a porosity of 50% or more and 70% or less.

4. The exhaust gas purification filter according to claim 1, wherein
    the porous partition includes communication pores allowing communication between adjacent ones of the cells across the porous partition, and the communication pores have a tortuosity of 1.0 or more and 1.4 or less.

* * * * *